(12) United States Patent
Appleyard et al.

(10) Patent No.: US 10,565,250 B2
(45) Date of Patent: *Feb. 18, 2020

(54) IDENTIFYING AND DISPLAYING RELATED CONTENT

(71) Applicant: International Business Machines Corporation, Armonk, NY (US)

(72) Inventors: James P. Appleyard, North Richland Hills, TX (US); Tanya E. Bubash, Grapevine, TX (US); Daniel J. Butterfield, Flower Mound, TX (US); Charla L. Stracener, Argyle, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,150

(22) Filed: Jun. 12, 2018

(65) Prior Publication Data

US 2018/0293245 A1    Oct. 11, 2018

Related U.S. Application Data

(63) Continuation of application No. 14/739,362, filed on Jun. 15, 2015, now Pat. No. 10,031,915.

(51) Int. Cl.
*G06F 16/44* (2019.01)
*G06F 16/435* (2019.01)

(52) U.S. Cl.
CPC .......... *G06F 16/447* (2019.01); *G06F 16/435* (2019.01)

(58) Field of Classification Search
None
See application file for complete search history.

(56) References Cited

U.S. PATENT DOCUMENTS 5,978,791 A * 11/1999 Farber .................. G06F 16/164
                                                             707/640
6,959,295 B1   10/2005 Puscar et al.
(Continued)

FOREIGN PATENT DOCUMENTS

| WO | 01/47182 A2 | 6/2001 |
| WO | 2007/066312 A1 | 6/2007 |
| WO | 2012154169 A1 | 11/2012 |

OTHER PUBLICATIONS

Chieu, et al., "Query Based Event Extraction along a Timeline", SIGIR '04, Jul. 25-29, 2004, Copyright 2004 ACM, pp. 425-432.

(Continued)

*Primary Examiner* — Hung D Le
(74) *Attorney, Agent, or Firm* — Daniel R. Simek

(57) ABSTRACT

The method includes identifying, by one or more computer processors, a first content consumed by a user. The method further includes identifying, by one or more computer processors, objects in the first content. The method further includes identifying, by one or more computer processors, a second content on the Internet that is similar to the first content, wherein the second content includes one or more objects that reach a threshold similarity to the identified objects in the first content. The method further includes identifying, by one or more computer processors, a date of creation for the identified first content and the date of creation of the second content. The method further includes arranging, by one or more computer processors, the identified first content and the identified second content in chronological order.

14 Claims, 3 Drawing Sheets

(56) References Cited

U.S. PATENT DOCUMENTS

| | | | |
|---|---|---|---|
| 7,698,300 B2 | 4/2010 | Yamamoto | |
| 8,005,927 B2 | 8/2011 | Apfel et al. | |
| 9,152,312 B1* | 10/2015 | Terleski | G06F 3/0488 |
| 2006/0190440 A1 | 8/2006 | Horvitz et al. | |
| 2007/0033184 A1 | 2/2007 | Friedman | |
| 2007/0112742 A1 | 5/2007 | Dumais et al. | |
| 2008/0250067 A1 | 10/2008 | Svendsen | |
| 2009/0049082 A1 | 2/2009 | Slaney et al. | |
| 2009/0171990 A1 | 7/2009 | Naef | |
| 2010/0100845 A1 | 4/2010 | Khan et al. | |
| 2010/0106732 A1 | 4/2010 | Atallah et al. | |
| 2011/0153598 A1 | 6/2011 | Kamimaeda et al. | |
| 2012/0011109 A1 | 1/2012 | Ambwani et al. | |
| 2012/0042388 A1 | 2/2012 | Kitts et al. | |
| 2012/0054171 A1 | 3/2012 | Gosset et al. | |
| 2013/0212090 A1* | 8/2013 | Sperling | G06F 16/3347 707/723 |
| 2014/0019975 A1* | 1/2014 | Schmidt | G06Q 10/10 718/100 |
| 2014/0025737 A1 | 1/2014 | Kruglick | |
| 2014/0150029 A1 | 5/2014 | Avedissian et al. | |
| 2014/0180788 A1 | 6/2014 | George et al. | |
| 2014/0214814 A1 | 7/2014 | Sankar et al. | |
| 2015/0100587 A1* | 4/2015 | Walkingshaw | G06F 16/954 707/748 |
| 2015/0154497 A1* | 6/2015 | Braziunas | G06F 16/93 706/12 |
| 2016/0019627 A1 | 1/2016 | Musil et al. | |
| 2016/0063117 A1* | 3/2016 | Carter | G06F 16/248 707/727 |
| 2016/0071182 A1* | 3/2016 | Nogues | G06F 16/435 705/26.7 |
| 2016/0092557 A1 | 3/2016 | Stojanovic et al. | |
| 2016/0147765 A1* | 5/2016 | Glover | G06F 8/00 707/723 |
| 2016/0191966 A1* | 6/2016 | Brodersen | G11B 27/105 725/5 |
| 2018/0300335 A1* | 10/2018 | Drochomirecki | G06F 16/9535 |

OTHER PUBLICATIONS

Li, et al., "A Probabilistic Model for Retrospective News Event Detection", SIGIR '05, Aug. 15-19, 2005, Copyright 2005 ACM, 8 pages.

Appleyard et al., "Identifying and Displaying Related Content", U.S. Appl. No. 14/739,362, filed Jun. 15, 2015, pp. 1-26.

IBM Appendix P., "List of IBM Patents or Patent Applications Treated as Related", filed Herewith, 2 pages.

* cited by examiner

IDENTIFYING AND DISPLAYING RELATED CONTENT

BACKGROUND

The present invention relates generally to Internet content, and more particularly to displaying similar Internet content.

RSS (Rich Site Summary); originally RDF Site Summary; often called Really Simple Syndication, uses a family of standard web feed formats to publish frequently updated information (e.g., blog entries, news headlines, audio, and video). An RSS document (called "feed," "web feed," or "channel") includes full or summarized text and metadata, such as publishing date and author's name.

RSS feeds enable publishers to syndicate data automatically. A standard extensible markup language (XML) file format ensures compatibility with many different machines/programs. RSS feeds also benefit users who want to receive timely updates from favorite websites or to aggregate data from many sites.

Subscribing to a website RSS removes the need for the user to manually check the website for new content. Instead, their browser constantly monitors the site and informs the user of any updates. The browser can also be commanded to automatically download the new data for the user.

Software termed "RSS reader," "aggregator," or "feed reader," which can be web-based, desktop-based, or mobile-device-based, present RSS feed data to users. Users subscribe to feeds either by entering a feed's uniform resource identifier (URI) into the reader or by clicking on the browser's feed icon. The RSS reader checks the user's feeds regularly for new information and can automatically download it, if that function is enabled. The reader also provides a user interface.

SUMMARY

Embodiments of the present invention disclose a method, computer program product, and system for identifying content. In one embodiment, in accordance with the present invention, the computer-implemented method includes identifying, by one or more computer processors, a first content consumed by a user. The method further includes identifying, by one or more computer processors, objects in the first content. The method further includes identifying, by one or more computer processors, a second content on the Internet that is similar to the first content, wherein the second content includes one or more objects that reach a threshold similarity to the identified objects in the first content. The method further includes identifying, by one or more computer processors, a date of creation for the identified first content and the date of creation of the second content. The method further includes arranging, by one or more computer processors, the identified first content and the identified second content in chronological order.

DETAILED DESCRIPTION

Embodiments of the present invention recognize that interest in a news story may continue after the initial exposure to the event. Embodiments of the present invention recognize that presenting similar content to an event of interest may be beneficial. Embodiments of the present invention recognize that a reader may want further background knowledge of an event.

Implementation of embodiments of the invention may take a variety of forms, and exemplary implementation details are discussed subsequently with reference to the Figures.

Figure 1:
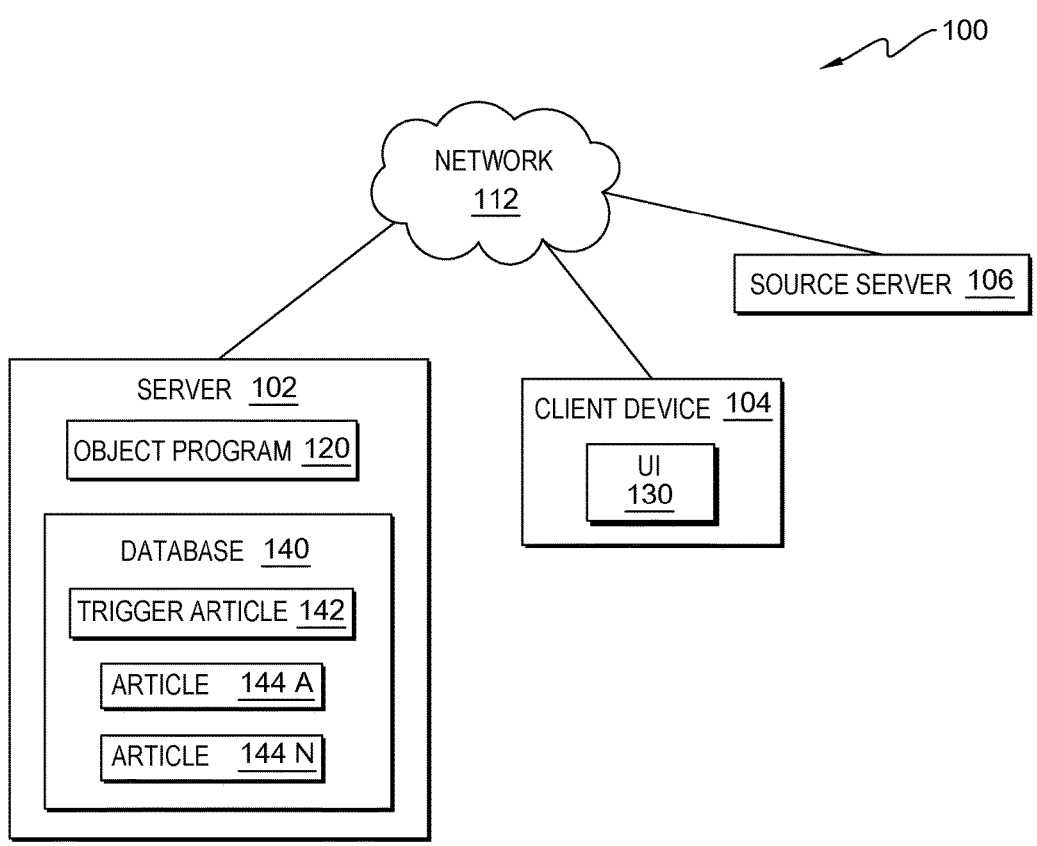
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102, source server 106, and client device 104, all interconnected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving, analyzing, and sending data. In this embodiment, server 102 identifies objects similar to objects consumed by a user and arranges the objects in order of creation. In some embodiments, consumed data may include content that was displayed for a predetermined amount of time. In an example, a user of object program 120 finds content (e.g., trigger article 142) on the Internet, and object program 120 displays the content for more than ten seconds before a user closes the content. In some embodiments, a user may preset the amount of time after which content is considered consumed (e.g., seconds, minutes, hours). In some embodiments, object program 120 may determine the amount of time needed to consume content based upon the length of the content (e.g., a two-page article needs less time to consume than a ten-page article.) In another embodiment, a user views a defined portion of content (e.g., at least 50%, at least 75%, all of the content, etc.), which indicates that the user has consumed the content.

In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with client device 104 and source server 106 via network 112. In another embodiment, server 102 represents a computing system utilizing clustered computers and components to act as a single pool of seamless resources. Server 102 may include components, as depicted and described in further detail with respect to FIG. 3, in accordance with embodiments of the present invention. Server 102 includes object program 120 and database 140.

In depicted distributed data processing environment 100, object program 120 resides on server 102 and identifies objects similar to objects consumed by a user and arranges the objects in order of creation. In various embodiments, object program 120 identifies objects in content that are consumed by a user of object program 120. Content may include media sources, such as newspapers, blogs, video clips, research papers, social media feeds, etc. For the purpose of this application, media and content may be used interchangeably. In one example, a user of object program 120 views a news article on a client device (e.g., client device 104). Object program 120 may be notified by a client version of object program located on the client device (not depicted), or the client device may be logged into an account of object program 120 when viewing the news article. In this example, object program 120 determines objects in the news article of interest to the user of object program 120 and determines if other related materials exist on the Internet. Object program 120 displays the related content based on the objects of interest in the materials and the date of creation for the materials. Object program 120 is depicted and described in further detail with respect to FIG. 2.

In the depicted embodiment, database 140 resides on server 102. In another embodiment, database 140 may reside elsewhere in distributed data processing environment 100, such as within client device 104 or independently as a standalone database that is capable of communicating with server 102 and/or client device 104 via network 112. A database is an organized collection of data. Database 140 is implemented with any type of storage device capable of storing data that is accessed and utilized by server 102 and client device 104, such as a database server, a hard disk drive, or a flash memory. In other embodiments, database 140 represents multiple storage devices within server 102. Database 140 stores information, such as user names, accounts, passwords, keywords, objects, publishing dates, timelines, etc. In various other embodiments, database 140 may contain user selected information, such as trusted sources, blogs, feeds, journals, authors, reporters, etc. In an example, database 140 stores a trusted source, such as a specific newspaper for an account. In another example, objects (e.g., title, author name, key words, names, search words, frequently used words, etc.) from an article that were viewed by a user of object program 120 are stored in database 140 for future searches of related sources. Database 140 includes trigger article 142 and articles 144A and 144N.

In depicted distributed data processing environment 100, trigger article 142 resides on database 140 and is a file containing media that was consumed by a user of object program 120. In some embodiments, trigger article 142 may contain key words, phrases, authors, titles, and/or other descriptive terms from the original media that was consumed by a user of object program 120. In an embodiment, trigger article 142 may represent user identified objects from an article consumed by a user of object program 120, which indicates search terms or criteria that the user deems important for related media. In yet another embodiment, object program 120 stores the entire media that was consumed by the user of object program 120.

In depicted distributed data processing environment 100, articles 144A and 144N reside on database 140 and are files containing media which is similar to trigger article 142. In some embodiments, articles 144A and 144N may be hyperlinks to media. In other embodiments, articles 144A and 144N may contain summaries of similar media or other descriptive features of the similar media, such as title, author, source, etc. Articles 144A and 144N are a generic representation of media similar to trigger article 142 stored on database 140.

In the depicted embodiment, client device 104 is one or more of a desktop computer, a laptop computer, a tablet computer, a specialized computer server, a smart phone, or any programmable electronic device capable of communicating with server 102 via network 112 and with various components and devices within distributed data processing environment 100. In general, client device 104 represents any programmable electronic device or combination of programmable electronic devices capable of executing machine readable program instructions and communicating with other computing devices via a network, such as network 112. Client device 104 may include components, as depicted and described in further detail with respect to FIG. 3, in accordance with embodiments of the present invention. In an embodiment, client device 104 may access object program 120 via network 112. In an example, client device 104 accesses object program 120, which creates a display of media related to an original media consumed by a user of object program 120. In some examples, a user of client device 104 may provide input to object program 120 via a user interface (e.g., user interface 130) located on client device 104. In an embodiment, client device 104 may include a client version of object program 120 (not depicted) which can communicate with object program 120 via network 112.

In depicted distributed data processing environment 100, user interface (UI) 130 resides on client device 104. UI 130 is a computer program that provides an interface between a user and object program 120. A user interface refers to the information, such as graphic, text, and sound, a program presents to a user, and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In the depicted environment, source server 106 is one or more of a management server, a web server, or any other electronic device or computing system capable of receiving and sending data. In other embodiments, source server 106 represents a server computing system utilizing multiple computers as a server system, such as in a cloud computing environment. In another embodiment, source server 106 represents one or more of a laptop computer, a tablet computer, a netbook computer, a personal computer (PC), a desktop computer, a personal digital assistant (PDA), a smart phone, or any programmable electronic device capable of communicating with server 102 and client device 104 via network 112. In another embodiment, source server 106 represents a computing system utilizing clustered computers and components to act as a single pool of seamless resources. Source server 106 communicates with object program 120 that allows object program 120 access to media sources on the Internet, such as news outlets, university websites, library databases, research journals, social media feeds, etc. In some embodiments, source server 106 is a generic server that hosts websites, databases, indexes, etc.

Figure 2:
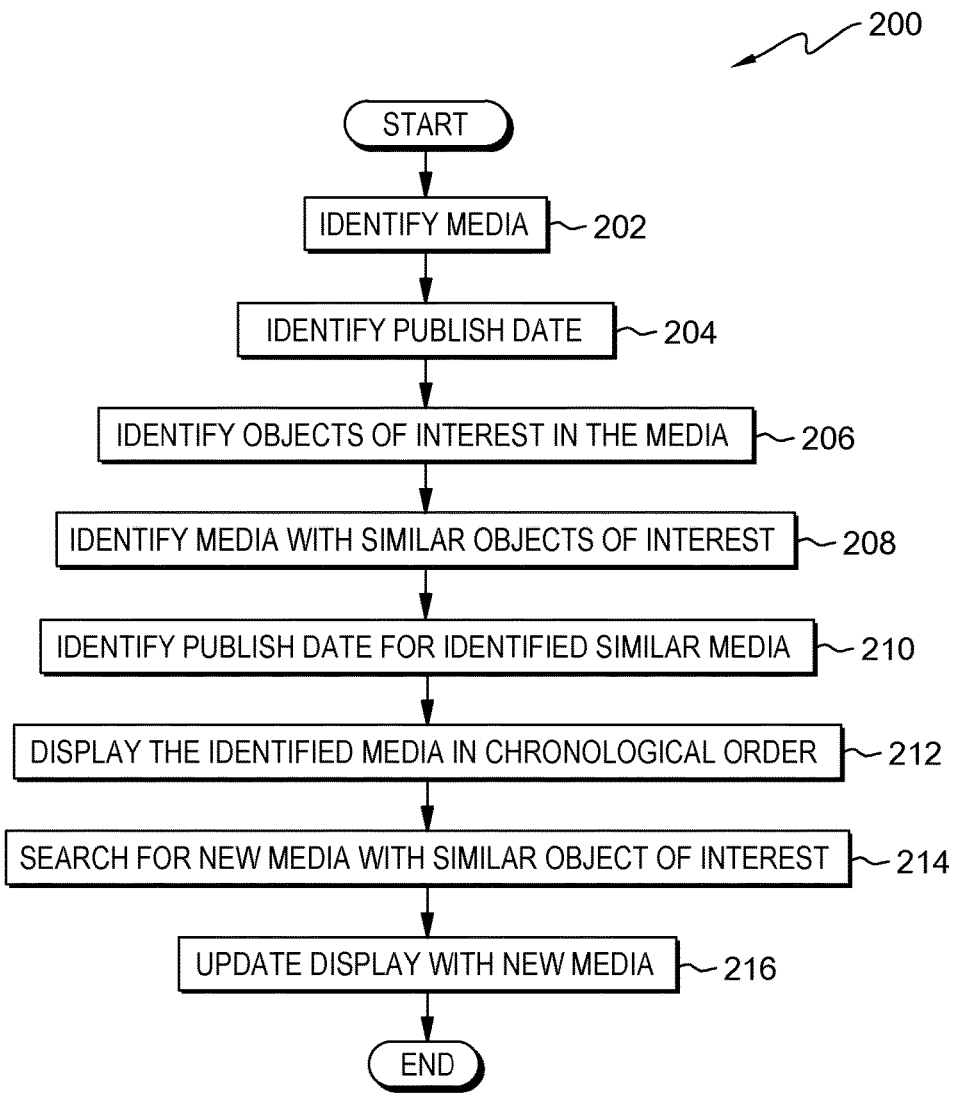
FIG. 2 is a flowchart depicting operational steps of a program for identifying objects similar to objects consumed by a user and arranging the objects in order of creation within the distributed data processing environment of FIG. 1, in accordance with an embodiment of the present invention.

FIG. 2 is a flowchart depicting operational steps of program 200, which is a function of object program 120, in accordance with an embodiment of the present invention. Program 200 operates on server 102 and identifies objects similar to objects consumed by a user and arranges the objects in order of creation. In various embodiments, program 200 may initiate when media is first accessed by a client device (e.g., client device 104) that has an account with object program 120. In another embodiment, a client device may log into an account of object program 120, which initiates the operational steps of program 200. In an embodiment, object program 120 may receive a notification from a client device to begin operational steps of program 200. In one embodiment, program 200 may begin the operational steps for program 200 at preset time intervals.

Program 200 identifies media (step 202). In an example, a user of client device 104 has accessed a news article hosted on the Internet by a server, such as source server 106. The user of client device 104 has an account with object program 120. In one variation, the user of client device 104 may first log onto an account of object program 120 and consume Internet media through object program 120. In another variation, the user of client device 104 may first log onto an account of object program 120 and then consume Internet media on client device 104. Program 200 may monitor Internet media being consumed by client device 104. In yet another variation, program 200 may send a request for a log of all Internet media consumed by the client device (e.g., client device 104) registered to an account holder at preset intervals. In various embodiments, Internet media may include news articles, published papers, blogs, feeds, library documents, government collected data, audio recordings, video recordings, etc.

In some embodiments, program 200 receives data indicating a user of object program 120 is consuming media (e.g., trigger article 142). In an example, a user of client device 104 views a news article (e.g., trigger article 142) while browsing source server 106. In an embodiment, program 200 receives data indicating that a user of object program 120 wants similar media sources (e.g., articles 144A and 144N) to the originally consumed media (e.g., trigger article 142). In an example, the user of object program 120 may submit the hyperlink to a media source to program 200, submit the entire media source to program 200, select the action to be taken on the currently viewed media source to program 200, etc.

Program 200 identifies the publish date (step 204). In some embodiments, program 200 identifies the publish date of the identified media from step 202. In an example, program 200 identifies the date the identified media was posted on the Internet. In another example, program 200 determines a publish date by using natural language processing. In various embodiments, program 200 may identify copyright dates. In an embodiment, program 200 may identify timestamps on the identified media sources from step 202. In some embodiments, program 200 identifies the date the media was consumed by the user of object program 120.

In yet other embodiments, program 200 determines dates within the media, such as an event date. In one example, program 200 identifies that a user consumed a media on Apr. 1, 2015, but the article was published on Mar. 28, 2015, and an event in the article (e.g., an earthquake) took place Mar. 15, 2015. In this example, program 200 stores all three dates along with metadata indicating the relation of the dates to consumption of media, publish date, and event date.

Program 200 identifies objects of interest in the media (step 206). In various embodiments, program 200 identifies objects of interest in the identified media from step 202. In an example, program 200 searches for repeating descriptive words, proper nouns, names, places, verbs, etc. In another example, program 200 may search for key words in the media source which are also in the title of the media source. In various embodiments, program 200 can utilize multiple identification techniques to identify objects of interest in the identified media source, such as natural language processing, key words, titles, titles of linked articles, summaries, terms used to search for the media, past terms used to search for the media, the quantity of times a term is used in the media, etc. In some embodiments, program 200 may send data indicating a list of terms that program 200 has determined to be objects of interest to a client device (e.g., client device 104) that consumed the initial article (e.g., trigger article 142). A user of the client device may select or indicate in some method known in the art which words, phrases, items, etc., are of relevance to program 200 for a further search. Program 200 may then receive data indicating objects of interest in the media as selected by a user of a client device (e.g., client device 104).

Program 200 identifies media with similar objects of interest (step 208). In some embodiments, program 200 accesses the Internet via a network, such as network 112, to identify media with similar objects of interest. In an example, program 200 accesses source server 106 to identify media with objects of interest which match the objects of interest from step 206. In one embodiment, program 200 may input the identified objects of interest from step 206 into a search engine to locate similar media. In some embodiments, program 200 may have preset media sources, authors, websites, libraries, institutions, etc., to search. In an embodiment, program 200 may only search the media source (e.g., a newspaper company) that created the initial media (e.g., trigger article 142) consumed by a user of object program 120. In another embodiment, program 200 may receive an indication from a user of program 200 indicating which media sources to search for similar objects of interest. For example, program 200 may send a prompt with a list of possible media to search that contains similar objects of interest to a client device (e.g., client device 104). Program 200 may receive data indicating the selection of a user of the client device. Program 200 may then search for similar object of interest in the selected media.

In various embodiments, program 200 determines if media has similar objects of interest to the objects of interest identified in step 206. In some embodiments, program 200 may determine the identified media is similar by utilizing natural language processing to identify objects of interest in the media. If a threshold percentage match exists, then program 200 may determine the media is similar to the identified media (e.g., trigger article 142). In another embodiment, program 200 identifies key words in the subsequently identified media to determine if the subject is similar to the identified media from step 202. In another embodiment, program 200 determines a percentage of similarity for identified media sources with similar objects of interest based upon the quantity of similar words, natural language processing, browser search terms, the amount of computing devices which have consumed the initial media source from step 202, and the subsequently identified media or any other method known by a person skilled in the art. In some embodiments, the identified similar media are stored in a database, such as database 140. In an example, program 200 determines that articles 144A and 144N are similar to trigger article 142 and stores the articles in database 140.

Program 200 identifies the publish date for identified similar media (step 210). In various embodiments, program 200 identifies a date that the identified similar media (e.g., articles 144A and 144N) were published. In an example, program 200 may identify the date a media source was published based on a filing or coding system. In some embodiments, program 200 may identify the date that the identified similar media was posted on the Internet. In an example, program 200 may search for a time and/or date located at the beginning or end of the identified media. In an embodiment, program 200 identifies the copyright date for the identified media. In one example, program 200 may search the identified media for a copyright sign in the identified media and then search for a date after the copyright symbol.

Program 200 displays the identified media in chronological order (step 212). In various embodiments, program 200 displays the identified media (e.g., articles 144A and 144N) in chronological order as well as displaying the initial media source (trigger article 142). In some embodiments, program 200 may arrange the identified similar media sources in a tree format based upon the different similar objects for the identified similar media. In various embodiments, program 200 may split identified media sources into a separate display if the media are below a threshold of similarity but are still similar enough to be identified by program 200. In an example, program 200 displays various articles related to a hurricane track, wind speed, location, etc. Program 200 may also display articles in a separate timeline or tree related to hurricane preparedness, water dispensing locations, etc. In an example, program 200 may send data to UI 130 on client device 104 displaying the identified media. A user may select attributes in the displayed similar media via UI 130 to continue following, and a user may sort similar media via UI 130 to set an order for display.

In an embodiment, an account with program 200 may have preset amounts of similar articles to be displayed. If a threshold number of media sources are similar to the initial media, program 200 may split the similar media into groups based on the similarity of the media sources to one another. In another embodiments, program 200 may group media based upon the source of the media, such as newspaper, blog, research paper, author, etc.

Program 200 searches for new media with similar objects of interest (step 214). In some embodiments, program 200 searches for new media on the Internet after displaying the related similar media in step 212. In an example, an account of object program 120 may have a preset interval for program 200 to search for new media with similar objects of interest every hour. In another example, a preset may change over time, such as program 200 searches for new media every hour after the initial media is consumed, then every day after three days has passed from the initial media consumption, and then once a week after two weeks has passed. In another example, program 200 may adjust the amounts of searches for new media on the Internet based on the number of similar objects of interest located. If multiple new media containing objects of interest are located program 200 may search more frequently; conversely, if few new media containing objects of interest are located, program 200 may search less frequently.

Program 200 updates the display with new media (step 216). In an embodiment, program 200 locates new media with objects of interest and displays the new objects of interest in the same display at the appropriate location based upon the publish date for the new media. In some embodiments, program 200 may create a new display based upon new media. In another embodiment, program 200 may merge separate displays of media. In an example, very few new media with similar objects of interest are being found by program 200; and therefore, program 200 reduces the threshold of similarity for displays and merges two similar topics into one display.

Figure 3:
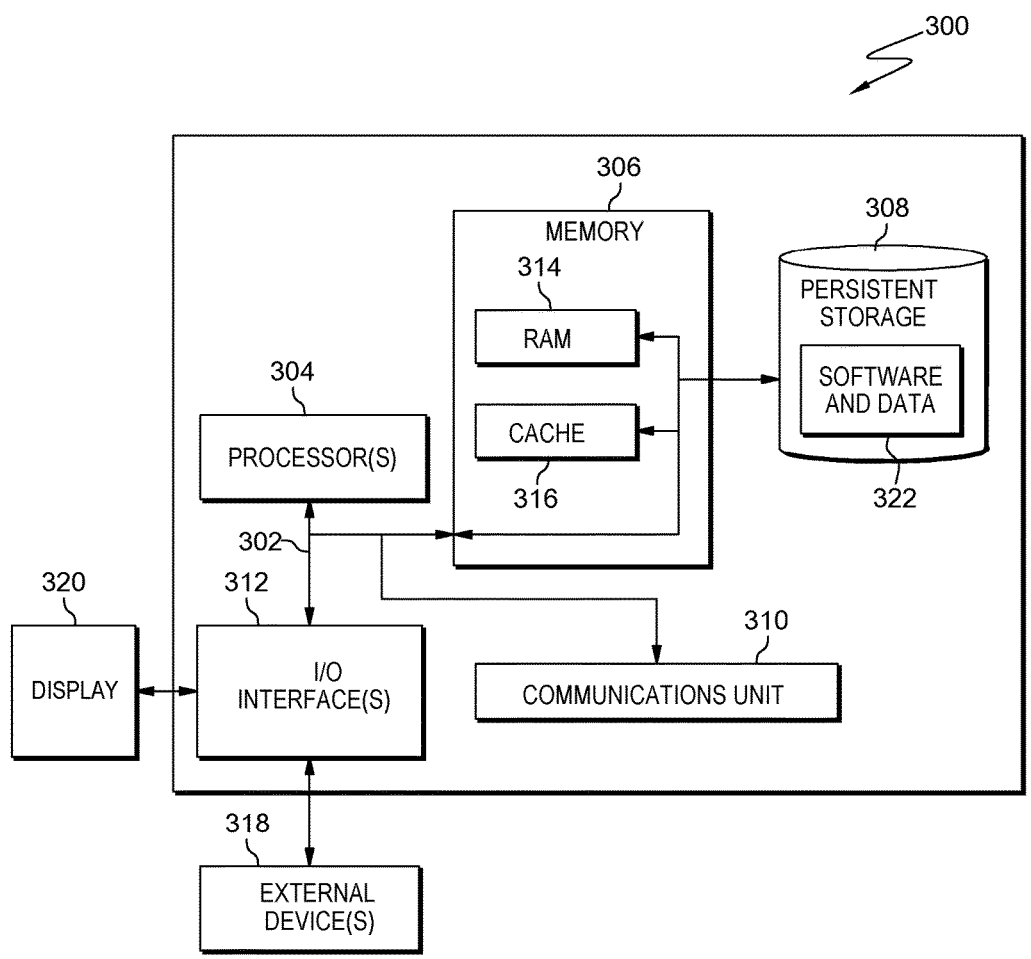
FIG. 3 depicts a block diagram of components of a client device, a server, and a source server of FIG. 1, in accordance with an embodiment of the present invention.

FIG. 3 depicts a block diagram of components of computer 300, which is representative of server 102 and client device 104, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media. Software and data 322 are stored in persistent storage 308 for access and/or execution by processor(s) 304 via one or more memories of memory 306. With respect to server 102, software and data 322 represents object program 120 and database 140.

In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface(s) 312 may provide a connection to external device(s) 318, such as a keyboard, a keypad, a touch screen, and/or some other suitable input device. External device(s) 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying content, the method comprising:
    identifying, by one or more computer processors, a first content viewed by a user;
    determining, by one or more computer processors, keywords utilized within the first content;
    determining, by one or more computer processors, a second content that is similar to the first content based on occurrences of one or more keywords within the second content reaching a threshold similarity to occurrences of the one or more keywords within the first content, and wherein the second content is determined based on an indication of users that view the first content and subsequently view the second content;
    identifying, by one or more computer processors, a date of creation for the identified first content and a date of creation of the second content;
    arranging, by one or more computer processors, the identified first content and the identified second content in chronological order;
    determining, by one or more computer processors, that a predetermined amount of time has elapsed from the arranging of the identified first content and the identified second content in chronological order;
    identifying, by one or more computer processors, a third content that is similar to the first content and the second content, wherein the third content includes occurrences of one or more keywords that are similar to keyword occurrences in the first content and the second content; and
    arranging, by one or more computer processors, the identified third content, the identified first content, and the identified second content in chronological order.

2. The method of claim 1, further comprising:
    identifying, by one or more computer processors, a previously arranged set of one or more pieces of content, wherein the set of one or more pieces of content includes occurrences of one or more keywords that are similar to keyword occurrences in the first content and the second content; and
    arranging, by one or more computer processors, the one or more pieces of content in the previously arranged set, the first content, and the second content in chronological order.

3. The method of claim 1:
    wherein content comprises one or more of: a newspaper article, a social media post, a blog, a video feed, a research paper, and a government report; and
    wherein keywords in content comprises one or more of: repeated words, phrases containing repeated words, proper nouns, dates, and user selected words, phrases, and dates.

4. The method of claim 1, further comprising:
    identifying, by one or more computer processors, a fourth content that is similar to the third content, wherein the fourth content includes occurrences of one or more keywords that are similar to keyword occurrences in the third content;
    creating, by one or more computer processors, an additional arrangement displaying the identified third content and the identified fourth content in chronological order; and
    removing, by one or more computer processors, the identified third content from the arrangement.

5. The method of claim 1, wherein identifying the first content viewed by a user comprises:
    identifying, by one or more computer processors, a content that was displayed for greater than a predetermined amount of time.

6. The method of claim 1, wherein determining a second content that is similar to the first content, further comprises:
    creating, by one or more computer processors, an Internet search utilizing the determined keywords utilized within the first content as Internet search terms;
    searching, by one or more computer processors, the Internet for content based upon the created Internet search terms; and
    determining, by one or more computer processors, whether content returned by the search reaches a threshold similarity based upon a comparison of keyword occurrences in the first content and occurrences of one or more keywords in the content returned by the search.

7. A computer program product for identifying content, the computer program product comprising:
    one or more computer readable storage media and program instructions stored on the one or more computer readable storage media, the program instructions comprising:
    program instructions to identify a first content viewed by a user;
    program instructions to determine keywords utilized within the first content;
    program instructions to determine a second content that is similar to the first content based on occurrences of one or more keywords within the second content reaching a threshold similarity to occurrences of the one or more keywords within the first content, and wherein the second content is determined based on an indication of users that view the first content and subsequently view the second content;
    program instructions to identify a date of creation for the identified first content and a date of creation of the second content; and program instructions to arrange the identified first content and the identified second content in chronological order;

program instructions to determine that a predetermined amount of time has elapsed from the arranging of the identified first content and the identified second content in chronological order;

program instructions to identify a third content that is similar to the first content and the second content, wherein the third content includes occurrences of one or more keywords that are similar to keyword occurrences in the first content and the second content; and program instructions to arrange the identified third content, the identified first content, and the identified second content in chronological order.

8. The computer program product of claim 7, further comprising program instructions, stored on the one or more computer readable storage media, to:

identify a previously arranged set of one or more pieces of content, wherein the set of one or more pieces of content includes occurrences of one or more keywords that are similar to keyword occurrences in the first content and the second content; and arrange the one or more pieces of content in the previously arranged set, the first content, and the second content in chronological order.

9. The computer program product of claim 7:

wherein content comprises one or more of: a newspaper article, a social media post, a blog, a video feed, a research paper, and a government report; and wherein keywords in content comprises one or more of: repeated words, phrases containing repeated words, proper nouns, dates, and user selected words, phrases, and dates.

10. The computer program product of claim 7, further comprising program instructions, stored on the one or more computer readable storage media, to:

identify a fourth content that is similar to the third content, wherein the fourth content includes occurrences of one or more keywords that are similar to keyword occurrences in the third content;

create an additional arrangement displaying the identified third content and the identified fourth content in chronological order; and remove the identified third content from the arrangement.

11. The computer program product of claim 7, wherein the program instructions to determine a second content that is similar to the first content, further comprises program instructions to:

create an Internet search utilizing the determined keywords utilized within the first content as Internet search terms;

search the Internet for content based upon the created Internet search terms; and determine whether content returned by the search reaches a threshold similarity based upon a comparison of keyword occurrences in the first content and occurrences of one or more keywords in the content returned by the search.

12. A computer system for identifying content, the computer system comprising:

one or more computer processors;

one or more computer readable storage media;

program instructions stored on the computer readable storage media for execution by at least one of the one or more computer processors, the program instructions comprising:

program instructions to identify a first content viewed by a user;

program instructions to determine keywords utilized within the first content;

program instructions to determine a second content that is similar to the first content based on occurrences of one or more keywords within the second content reaching a threshold similarity to occurrences of the one or more keywords within the first content, and wherein the second content is determined based on an indication of users that view the first content and subsequently view the second content;

program instructions to identify a date of creation for the identified first content and a date of creation of the second content; and program instructions to arrange the identified first content and the identified second content in chronological order;

program instructions to determine that a predetermined amount of time has elapsed from the arranging of the identified first content and the identified second content in chronological order;

program instructions to identify a third content that is similar to the first content and the second content, wherein the third content includes occurrences of one or more keywords that are similar to keyword occurrences in the first content and the second content; and program instructions to arrange the identified third content, the identified first content, and the identified second content in chronological order.

13. The computer system of claim 12, further comprising program instructions, stored on the computer readable storage media for execution by at least one of the one or more processors, to:

identify a previously arranged set of one or more pieces of content, wherein the set of one or more pieces of content includes occurrences of one or more keywords that are similar to keyword occurrences in the first content and the second content; and arrange the one or more pieces of content in the previously arranged set, the first content, and the second content in chronological order.

14. The computer system of claim 12, wherein the program instructions to determine a second content that is similar to the first content, further comprises program instructions to:

create an Internet search utilizing the determined keywords utilized within the first content as Internet search terms;

search the Internet for content based upon the created Internet search terms; and determine whether content returned by the search reaches a threshold similarity based upon a comparison of keyword occurrences in the first content and occurrences of one or more keywords in the content returned by the search.

* * * * *